United States Patent
Asami et al.

(10) Patent No.: US 8,217,308 B2
(45) Date of Patent: Jul. 10, 2012

(54) HEATER-EQUIPPED SEAT

(75) Inventors: Naohito Asami, Nara (JP); Masanori Nishikawa, Nara (JP)

(73) Assignee: Panasonic Corporation, Osaka (JP)

( * ) Notice: Subject to any disclaimer, the term of this patent is extended or adjusted under 35 U.S.C. 154(b) by 353 days.

(21) Appl. No.: 12/596,536

(22) PCT Filed: Apr. 17, 2008

(86) PCT No.: PCT/JP2008/001019
§ 371 (c)(1),
(2), (4) Date: Oct. 19, 2009

(87) PCT Pub. No.: WO2008/132822
PCT Pub. Date: Nov. 6, 2008

(65) Prior Publication Data
US 2010/0096379 A1   Apr. 22, 2010

(30) Foreign Application Priority Data

Apr. 19, 2007 (JP) ................. 2007-110240
Apr. 8, 2008 (JP) ................. 2008-099902

(51) Int. Cl.
*H05B 1/00* (2006.01)
*H05B 3/34* (2006.01)

(52) U.S. Cl. ........ 219/217; 219/211; 219/212; 219/505; 219/528; 219/529; 219/544; 219/545; 219/548; 219/549; 219/552; 219/553

(58) Field of Classification Search ............ 219/217, 219/211–2, 505, 528–9, 544–5, 548–9, 552–3
See application file for complete search history.

(56) References Cited

U.S. PATENT DOCUMENTS
2006/0289421 A1 * 12/2006 Axinte et al. ............ 219/217

FOREIGN PATENT DOCUMENTS
| DE | 102005008457 A1 | 8/2006 |
| JP | 2002-087132 A | 3/2002 |
| JP | 2002-270338 A | 9/2002 |
| JP | 2004-275370 A | 10/2004 |
| JP | 2006-298039 A | 11/2006 |
| RU | 24818 U1 | 8/2002 |

OTHER PUBLICATIONS

International Search Report for International Application No. PCT/JP2008/001019, dated Jul. 15, 2008, 1 page.
European Search Report for European Application No. 08751563.1, dated Jun. 7, 2010, 4 pages.
Decision on Grant Patent for Invention for counterpart Russian Application No. 2009138342/11, dated Oct. 28, 2011, 8 pages.

* cited by examiner

*Primary Examiner* — Shawntina Fuqua
(74) *Attorney, Agent, or Firm* — Brinks Hofer Gilson & Lione

(57) ABSTRACT

A more comfortable seat is provided by detecting whether or not a person is in a seat. A seat has a heating element 1, a seat surface temperature detector 5 that is situated below a seat surface cover and that detects the temperature of the seat surface, and a seating determination unit 6 for determining whether or not a seat is occupied. A determination is made as to whether or not a seat is occupied according to an amount of temperature change detected by the seat surface temperature detector 5 for a predetermined period of time, whereby a determination can be readily made as to whether or not a person is seated. When no one is seated, application of power to the heating element 1 is stopped, and the like, which in turn contributes to energy saving and enhancement of fuel efficiency.

9 Claims, 3 Drawing Sheets

HEATER-EQUIPPED SEAT

TECHNICAL FIELD

The present invention relates to a heater-equipped seat having a heating device, such as a seat heater.

BACKGROUND ART

A seat heater (a heater for a seat) having a heater wire, which is a heating element, laid in, such as nonwoven fabric and urethane, has hitherto been used often for the heater-equipped seat of this type. The seat heater is accommodated in a seat, to thus heat a seating face.

FIG. 4 shows a related-art heater-equipped seat. As show in FIG. 4, a seat (not shown) usually has therein a heating element 1; a temperature detector 2 that is thermally coupled to the heating element 1 and that detects a temperature of the heating element 1; an operation unit 3, such as a switch by which a user turns on/off a heater (seat heater) and an adjustable controller by which the user varies a preset temperature; and a controller 4 that controls energization of the heating element 1 in accordance with a temperature detected by the temperature detector 2 and a state of the operation unit 3.

A thermistor is usually used for the temperature detector 2. A common control scheme is to utilize a phenomenon in which a resistance value of the thermistor changes according to a temperature of the heating element 1, and to control a temperature by detection of the phenomenon.

For instance, provided that the operation unit 3 is an adjustable controller for varying a preset temperature, the temperature of the heating element 1 is detected by the temperature detector 2, such as a thermistor. The controller 4 compares the thus-detected temperature with a temperature preset by the user through use of the adjustable controller. When the preset temperature has not yet been achieved, power is applied to the heating element 1. In contrast, when the preset temperature has already been achieved, application of power to the heating element 1 is suspended, thereby controlling the temperature.

Subsequently, application of power to the heating element 1 is resumed after elapse of a predetermined period of time since application of power was shut off or when the temperature of the heating element 1 has decreased to a predetermined temperature level. Temperature control is carried out by repetition of these operations.

The heater-equipped seat is set primarily in a driver's seat and a front passenger's seat in many cases. In particular, it is also assumed that no body is in the front passenger seat. If a operating unit for the front passenger seat is set in a heating position at this time, the heater will operate despite absence of a passenger after starting of the engine, which results in unwanted power consumption and deterioration of fuel efficiency.

Accordingly, various contrivances have hitherto been proposed as seating sensors for determining whether or not a passenger is in a seat. For instance, a known seat sensor has a plurality of cells disposed on a seat surface for detecting partial pressure from arrays, which are defined by rows set along a seat surface of a seat in its widthwise direction and columns set along the seat surface in its front-to-back direction, and determines whether or not a passenger is in a seat in accordance with the partial pressure detected by the cells (see; for instance, Patent Document 1).
Patent Document 1: JP-A-2002-87132

DISCLOSURE OF THE INVENTION

Problem that the Invention is to Solve

However, the related-art configuration requires the plurality of cells for detecting pressure. Therefore, the number of components and the weight of the seat are increased, thereby leading to an increase in price hike and deterioration of fuel efficiency.

The present invention solves drawbacks of the related art and aims at providing a more comfortable seat that detects a passenger in a seat by detecting only the temperature of the seat surface.

Means for Solving the Problem

In order to solve the problem of the related art, a heater-equipped seat of the present invention has a seat surface temperature detector that is situated below a seat surface cover of a seat and that detects a temperature of a seat surface; and a seating determination unit that determines whether or not a person is in the seat, wherein a determination is made as to whether or not a seat is occupied according to an amount of temperature change detected by the seat surface temperature detector during a predetermined period of time.

By virtue of the configuration, it is possible to readily determine whether or not a person is seated. When no one is seated, application of power to the heating element is stopped, and the like, which in turn contributes to energy saving and enhancement of fuel consumption.

Advantage of the Invention

A heater-equipped seat of the present invention aims at providing a seat that can contribute to energy saving and enhancement of fuel efficiency by determining whether or not a seat is occupied through detection of the temperature of a seat surface.

DESCRIPTION OF THE REFERENCE NUMERALS AND SYMBOLS

Figure 1:
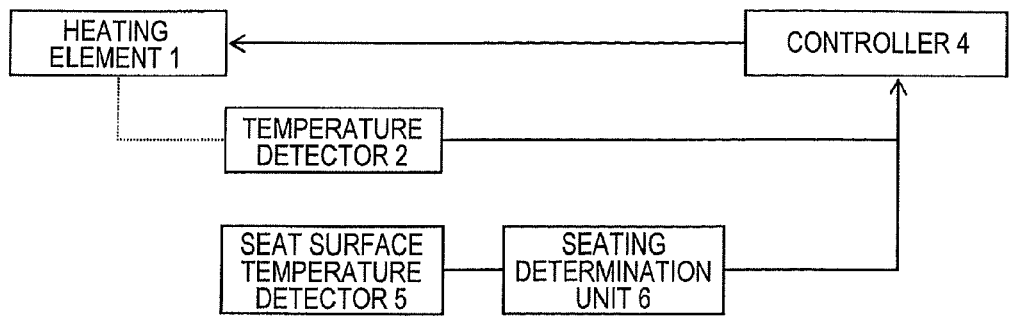
FIG. 1 is a block diagram of a heater-equipped seat of a first embodiment of the present invention.

1 HEATING ELEMENT
2 TEMPERATURE DETECTOR
3 OPERATION UNIT
4 CONTROLLER
5 SEAT SURFACE TEMPERATURE DETECTOR
6 SEATING DETERMINATION UNIT

BEST MODE FOR CARRYING OUT THE INVENTION

A first invention provides a heater-equipped seat comprising: a heating element arranged on a seat; a temperature detector for detecting a temperature of the heating element; a controller for controlling application of power to the heating element according to a temperature detected by the temperature detector; a seat surface temperature detector that is situated below a seat surface cover of a seat and that detects a temperature of a seat surface; and a seating determination unit that determines whether or not a person is in the seat, wherein the seating determination unit determines whether or not a seat is occupied according to an amount of temperature change detected by the seat surface temperature detector during a predetermined period of time. It is thereby possible to readily determine whether or not a person is seated without use of a seating detection sensor, such as a pressure sensor.

In a second invention, the controller of the first invention particularly stops application of power to the heating element when a result of determination made by the seating determination unit shows that the seat is unoccupied, so that unwanted power consumption can be prevented, which leads to energy saving and enhancement of fuel efficiency.

In a third invention, the controller of the first invention particularly decreases a rate of application of power to the heating element when the result of determination made by the seating determination unit shows that the seat is unoccupied, so that unwanted power consumption can be prevented, which leads to energy saving and enhancement of fuel efficiency. Further, there can be provided a more comfortable seat that provides appropriate feeling of warmth even when a person is again seated.

In a fourth invention, the seating determination unit of the first through third inventions particularly determines whether or not a seat is occupied, at each predetermined period of time. It is thereby possible to automatically detect that the seat is occupied even when the person is again seated even after the seat has once been determined to be unoccupied, whereby application of power to the heating element can thereby be commenced. Therefore, a more comfortable seat can be provided.

In a fifth invention, the seat surface temperature detector of the first through fourth inventions is particularly situated between a center of the seat surface and an end face of the seat surface, whereby the temperature of a contact area (legs) of the person can be detected more reliably. A difference between the temperature acquired when a seat is occupied and the temperature acquired when the seat is unoccupied becomes clearer, so that a more reliably determination can be made as to whether or not a seat is occupied.

In a sixth invention, particularly the seat surface temperature detector of the first through fifth inventions is not placed immediately above the heating element, whereby the seat surface temperature detector is made less susceptible to a change in the temperature of the heating element and can more reliably detect a temperature change resulting from a seat being taken by a person.

An embodiment of the present invention will hereinafter be described by reference to the drawings. However, the present invention is not limited to the embodiment.

First Embodiment

FIG. 1 is a block diagram of a heater-equipped seat of a first embodiment of the present invention. In FIG. 1, a heating element 1 is a heater wire, and a temperature detector 2 is; for instance, a thermistor, and disposed along with the heating element 1 and thermally coupled to the same. A controller 4 is for controlling application of power to the heating element 1 according to the temperature detected by the temperature detector 2. A seat surface temperature detector 5 is; for instance a thermistor. The seat surface temperature detector is for detecting the temperature of the seat surface while built in a position below a seat surface of a seat. A seating determination unit 6 is for determining, from the temperature detected by the seat surface temperature detector 5, whether or not a seat is occupied or not.

Operation and a working-effect of the heater-equipped seat made up as mentioned above are hereinbelow described.

A heater is; for instance, a seat heater used in an automobile. Some heaters have a configuration that enables a user to turn on/off power by means of an adjustable controller, a switch, or the like, or to arbitrarily vary a preset temperature. The temperature detector 2; for instance, a thermistor, is thermally coupled to the heating element 1 and configured in such a way that a resistance value varies according to the temperature of the heating element 1.

The controller 4 calculates the temperature of the heating element 1 from the resistance value detected by the temperature detector 2; determines whether to apply or shut off power to the heating element 1 according to the thus-calculated temperature; and performs control operation such that the heating element 1 has an optimum temperature.

In the meantime, when the user has left his/her seat while the switch, the adjustable controller, and the like, which are to be operated by the user is left powered, the seat heater will keep operating. Further, when held in that state, the seat heater will start operation likewise when the engine is started next time.

The heater-equipped seat is also often set for both a driver's seat and a front passenger seat in an automobile, and the possibility of the front passenger seat being unoccupied is also high. When the phenomenon mentioned above arises at that time, the seat heater is applied with power in spite of no one being in the front passenger seat, which consumes unwanted power and deteriorates fuel efficiency. The same also applies to a case where a driver has left his/her seat.

Figure 2:
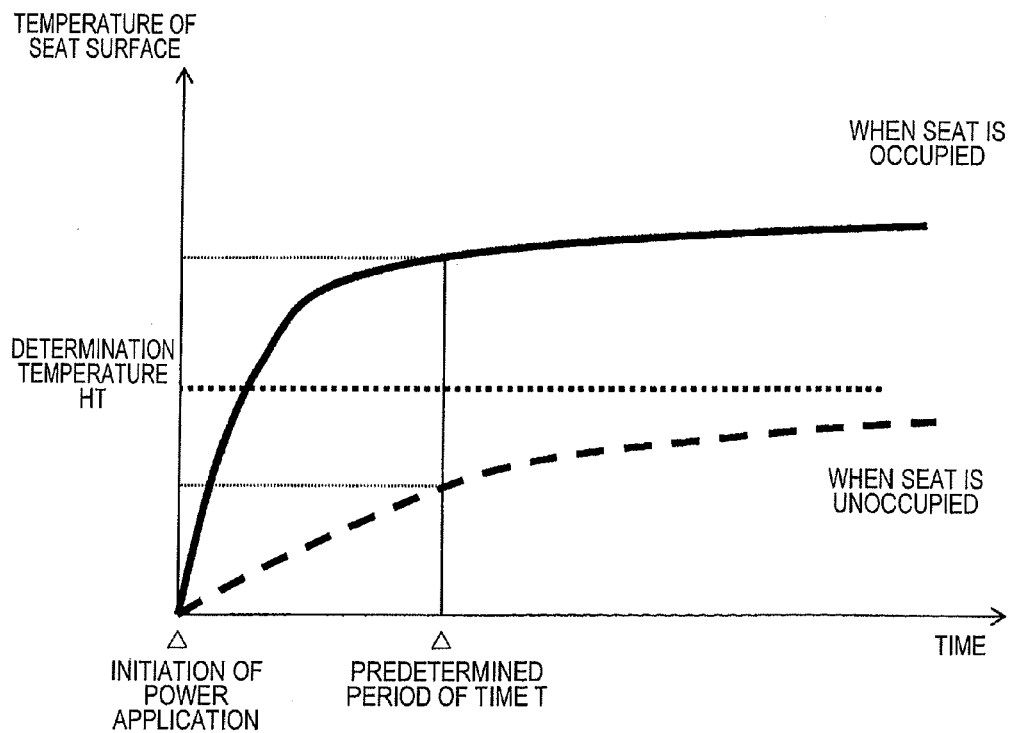
FIG. 2 is a descriptive view showing conceptual illustration of progression of a seat temperature.

FIG. 2 is a descriptive view showing a conceptual illustration of a change in the temperature of a seat surface of the seat when the seat is occupied and unoccupied.

In relation to a temperature change achieved when a passenger is seated and a temperature change achieved when no one is seated, an increase in temperate of the seat surface becomes greater because the influence of a body temperature and a heat retaining property are enhanced when the seat is occupied.

Specifically, when attention is paid to a change in the temperature of a heat surface arising from when application of power to the heating element 1 is started until when a predetermined period of time elapses, the amount of heat change achieved when the seat is occupied becomes greater than the amount of heat change achieved when the seat is unoccupied.

Consequently, when the temperature change, which is detected by the seat surface temperature detector 5 when application of power to the heating element 1 is started until when a predetermined period of time T elapses, is a predetermined temperature (a determination temperature HT) or more, the seat can be determined to be occupied. When the temperature change is less than the predetermined temperature (the determination temperature HT), the seat can be determined to be unoccupied.

A temperature change achieved at an ambient temperature of 0° C. after elapse of for instance, three minutes, is 30 degrees when the seat is occupied and about five degrees when the seat is unoccupied. In such a case, a reliable determination can be made as to whether or not the seat is occupied, so long as the determination temperature HT is set to about 15 degrees.

From the above explanations, a determination can be made as to whether or not the seat is currently occupied, by means of placing the seat surface temperature detector 5; for instance, a thermistor, below the seat surface and detecting the temperature of the seat surface, to thus detect a change in the temperature of the seat surface.

As mentioned above, a determination can be made as to whether or not the seat is occupied by detecting a change in the temperature of the seat surface. Hence, it is possible to easily determine whether or not a seat is occupied without use of a seating detection sensor, such as a pressure sensor.

The temperature detector 2 usually controls a temperature according to the temperature of the heating element 1. However, because of the ability to detect the temperature of the seat surface, the controller 4 can control a temperature closer to the temperature of a human body by means of performing temperature control through use of the temperature of the heat surface at the time of making of a determination as to whether or not the seat is occupied; therefore, more comfortable temperature control becomes possible.

Descriptions have been provided above to a determination that is made as to whether or not the seat is occupied on the basis of the amount of temperature change detected by the seat surface temperature detector 5 from when application of power to the heating element 1 is started until when a predetermined period of time T elapses. However, as shown in FIG. 2, a temperature achieved in a stable state also changes between when the seat is occupied and when the seat is unoccupied. Therefore, a determination can also be made, from an absolute value of a temperature rather than the amount of temperature change, as to whether or not the seat is occupied.

At an ambient temperature of for instance, 0° C., the temperature of an occupied seat comes to about 30° C. after elapse of five minutes since initiation of application of power, and the temperature of an unoccupied seat comes to about 10° C. In such a case, so long as the determination temperature HT is set to 20° C., the seat is determined to be occupied when the temperature detected by the seat surface temperature detector 5 at a predetermined period of time is 20° C. or more, and the seat is determined to be unoccupied when the temperature is less than 20° C., whereby a determination can be made as to whether or not a seat is occupied.

The essential requirement for determination of a predetermined time T and the determination temperature HT is to measure a temperature characteristic achieved when a seat is occupied and a temperature characteristic achieved when a seat is unoccupied.

When a result of determination made by the seating determination unit 6 shows that the seat is unoccupied, the controller 4 of the present embodiment shuts off application of power to the heating element 1, so that application of power to the heating element 1 can be shut off; for instance, when no one is in the front passenger seat and when a driver has left the driver's seat. Therefore, unwanted power consumption can be prevented, which leads to enhancement of fuel efficiency.

When the result of determination made by the seating determination unit 6 shows that the seat is unoccupied, the controller 4 of the present embodiment decreases a rate of application of power to the heating element 1. For instance, when the user has left his/her seat, the rate of application of power is decreased (i.e., a preset temperature is reduced), whereby power consumption can be reduced. Further, since application of power is continually performed, appropriate feeling of warmth is obtained when the user takes a seat next time. Thus, a more comfortable heater-equipped seat can be provided. This particularly effective for a driver's seat where the driver is inevitably seated during driving operation.

Further, the seating determination unit 6 of the present embodiment determines whether or not a seat is occupied at every predetermined time. As a result, even when the user has left his/her seat (i.e., an unoccupied state) even after the seat has once been determined to be occupied, an unoccupied state can automatically be detected, whereby enabling shutoff of application of power to the heating element 1 and a reduction in the rate of power application. Therefore, it is possible to prevent unwanted power consumption and to provide a more comfortable seat.

Moreover, when consideration is given to a case where the rate of power application is reduced after the seat has once been determined to be unoccupied, application of power to the heating element 1 and shutoff of power application are repeatedly performed even when the seat is unoccupied. Therefore, if the user is seated, the temperature detected by the seat surface temperature detector 5 increases from the temperature achieved when the seat is unoccupied, as mentioned previously.

Accordingly, the temperature of the seat surface temperature detector 5 is detected at a predetermine period of time; for instance, after elapse of 10 minutes since initiation of power application, whereby a determination can be made as to whether or not the seat is occupied by means of the thus-detected temperature difference. Moreover, the application of power to the heating element 1 is controlled at this time, to thus return the temperature to the original preset temperature (a temperature achieved before a decrease in the rate of power application). Thereby, the seat is heated at the original preset temperature when the seat is occupied, and the preset temperature is reduced when the seat is unoccupied, whereby an attempt can be made to save power. Thus, a seat with a more efficient heater can be provided.

When the seat surface temperature detector 5 is set at; for instance, the center of the seat surface, the seat surface temperature detector 5 is situated in the middle of the crotch, to thus come to hardly contact the human body. Alternatively, in a case where the seat surface temperature detector is disposed at a rearward position on the seat surface, the seat surface temperature detector 5 comes to hardly contact a human body when the user is seated in a forwardly-displaced position. In such a case, the neighborhood of the seat surface temperature detector 5 is exposed to an air, and the heat retaining property of the heater is deteriorated as a result of the seat surface temperature detector being out of contact with the human body. Therefore, an increase in the temperature of the seat surface temperature detector 5 decreases.

Since a difference between the temperature detected by the seat surface temperature detector 5 when the seat is occupied and the temperature detected by the same when the seat is unoccupied becomes smaller, it becomes difficult to determine whether or not a seat is occupied.

Figure 3:
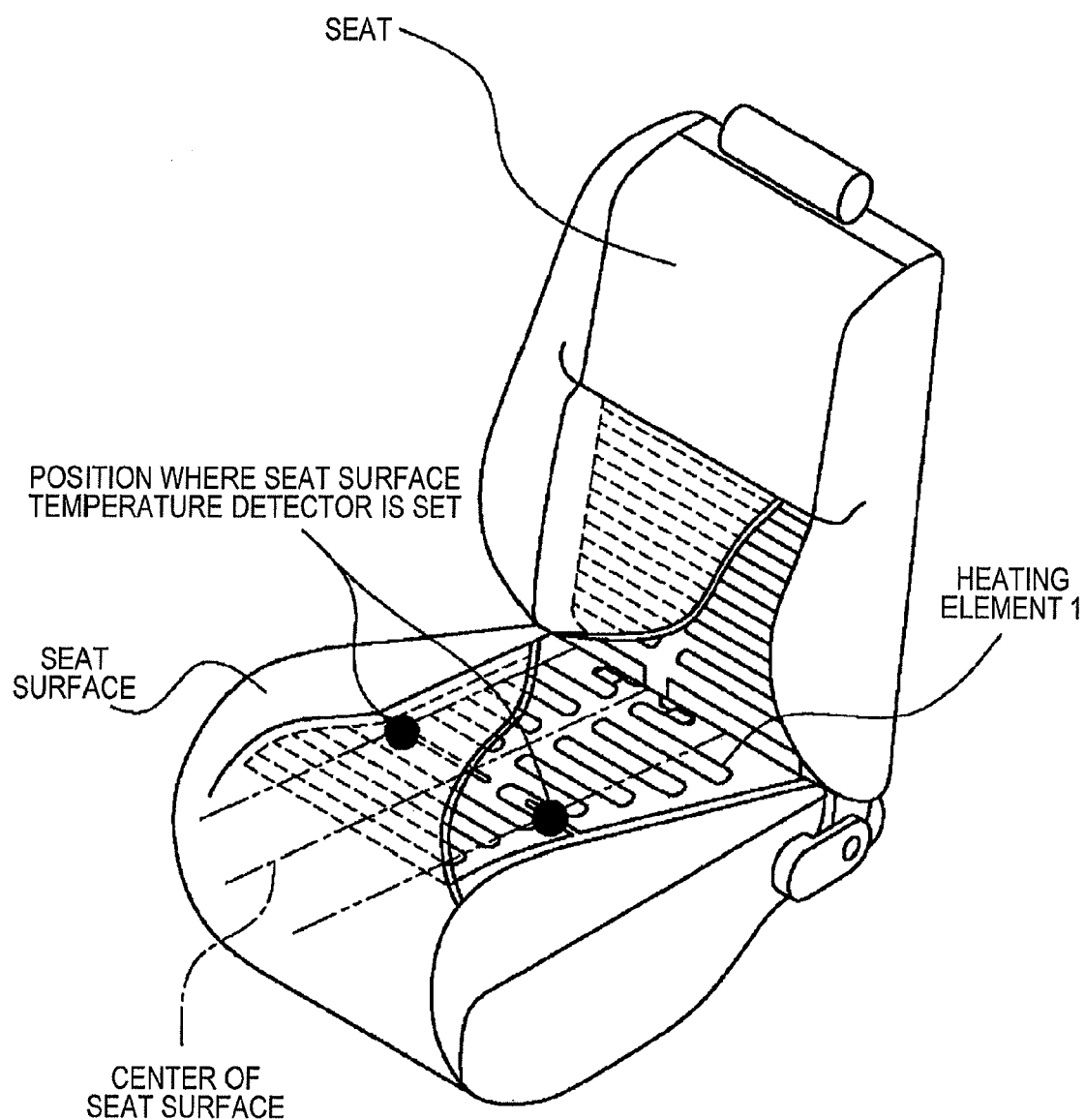
FIG. 3 is a perspective view of the heater-equipped seat showing a location where a seat surface temperature detector is disposed.
Figure 4:
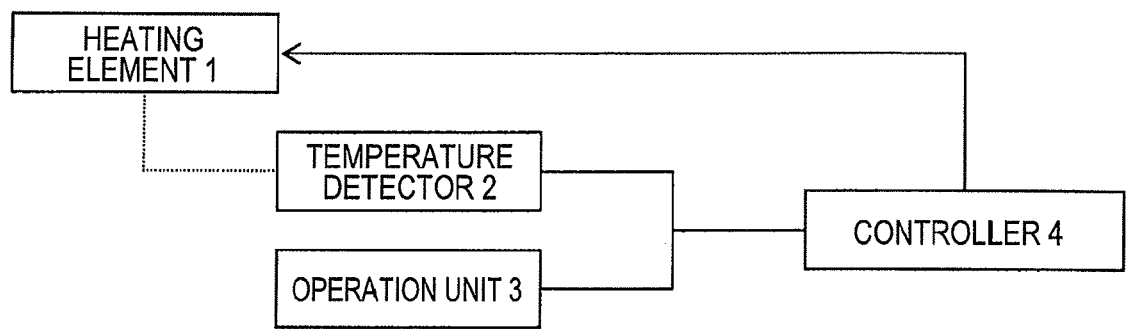
FIG. 4 is a block diagram of a related-art heater-equipped seat.

Accordingly, the seat surface temperature detector 5 of the present embodiment is situated at a position between the center of the seat surface of the seat in its sideway direction and an end face of the seat surface as shown in FIG. 3, whereby the seat surface temperature detector becomes easy to contact the back of thighs of the human body. As a result, heat conduction and a temperature retaining property, which are realized by a body temperature, are enhanced, so that the temperature of the neighborhood of the seat surface temperature detector 5 is likely to rise. As a result, since the temperature detected by the seat surface temperature detector 5 becomes easy to increase when the seat is occupied. Therefore, a difference between the temperature achieved when the seat is occupied and the temperature achieved when the seat is unoccupied becomes much clearer, so that a more reliable determination can be made as to whether or not the seat is occupied.

FIG. 3 is a view of a layout in which the seat surface temperature detector 5 is situated at a center area that is located at an intermediate position between the center of the seat surface and the end face of the seat surface. A similar effect is yielded, so long as the seat surface temperature detector is placed along a line at an intermediate position between the center of the seat surface and the end face of the seat surface and where the seat surface temperature detector contacts a human body without fail (e.g., a hip, and the like).

Thus, the seat surface temperature detector 5 can be provided so as to avoid a hanging portion of a seat surface cover, so that seating determination function can be provided without impairing a design characteristic of a seat.

Meanwhile, when provided at a position immediately above the heating element 1, the seat surface temperature detector 5 is affected by the temperature of the heating element 1. Even when the seat is unoccupied, the amount of temperature change becomes great. Therefore, the seat surface temperature detector 5 is not disposed at a position immediately above the heating element 1, whereby it becomes less susceptible to a change in the temperature of the heating element 1 and can detect a temperature change due to seating of a human body more reliably.

Although a determination is made as to whether or not the seat is occupied on the basis of a difference between the temperature achieved when the seat is occupied and the temperature achieved when the seat is unoccupied. A temperature characteristic achieved when the seat is occupied and a temperature characteristic achieved when the seat is unoccupied differ from each other according to an internal temperature of a vehicle compartment. Therefore, the determination temperature may also be switched according to the internal temperature of the vehicle compartment.

Moreover, when the internal temperature of the vehicle compartment is high and when it becomes difficult to determine whether or not a seat is occupied as a result of a reduction in difference between the temperature achieved when the seat is occupied and the temperature achieved when the seat is unoccupied, the heating element 1 is not applied with power at all times because the high internal temperature of the vehicle compartment and obviation of a necessity to activate the heater of the seat. It becomes unnecessary to switch power control according to a determination as to whether a seat is occupied or unoccupied. Therefore, in an environment where the heater of the seat does not operate (does not need to be activated), such as a high internal temperature of the vehicle compartment, a determination as to whether or not a seat is occupied is not performed, and it is desirable to determine a determination value (a predetermined time and a determination temperature) in connection with a limited temperature range where the heater of the seat operates.

As mentioned above, a determination can easily be made as to whether or not a seat is occupied by detection of a change in the temperature of the seat surface. Further, application of power to the heating element 1 is stopped when the seat is unoccupied, which contributes to energy saving and enhancement of fuel efficiency.

The present patent application is based on Japanese Patent Application No. 2007-110240 filed on Apr. 19, 2007 and Japanese Patent Application No. 2008-099902 filed on Apr. 8, 2008, contents of which are incorporated herein by reference.

Although various embodiments of the present invention have been described thus far, the present invention is not limited to the matters provided in the embodiment. The present invention is also scheduled to be altered or applied by the skilled artisans on the basis of the descriptions of the present patent application and the well-known techniques, all of which fall within a scope where protection of the invention is sought.

INDUSTRIAL APPLICABILITY

As mentioned above, a heater-equipped seat of the present invention can determine whether or not a seat is occupied by detecting the temperature of a seat surface. Hence, the present invention can also be applied to and developed into detection of activation of an air bag (switching of an operating seat and switching of an operating area).

The invention claimed is:

1. A heater-equipped seat comprising:
   a heating element;
   a temperature detector configured to detect a temperature of the heating element;
   a controller configured to adjust power applied to the heating element, according to the temperature detected by the temperature detector;
   a seat surface temperature detector that is situated below a seat surface cover of a seat and that detects a temperature of the seat surface cover; and
   a seating determination unit that determines whether or not a person is in the seat, according to a change of the temperature detected by the seat surface temperature detector during a predetermined period of time which begins upon application of the power to the heating element.

2. The heater-equipped seat according to claim 1, wherein the controller stops the power applied to the heating element when the seating determination unit determines that the seat is unoccupied.

3. The heater-equipped seat according to claim 1, wherein the controller decreases the power applied to the heating element when the seating determination unit determines that the seat is unoccupied.

4. The heater-equipped seat according to claim 1, wherein the seating determination unit determines at intervals whether or not a seat is occupied.

5. The heater-equipped seat according to claim 1, wherein the seat surface temperature detector is situated between a center of the seat surface and an end face of the seat surface.

6. The heater-equipped seat according to claim 1, wherein the seat surface temperature detector is not placed immediately above the heating element.

7. The heater-equipped seat according to claim 1, wherein the seating determination unit determines whether or not a person is in the seat, according to a change of the temperature detected during a predetermined time by the seat surface temperature detector.

8. The heater-equipped seat according to claim 1, wherein the seating determination unit determines whether or not a person is in the seat, based on whether the temperature detected by the seat surface temperature detector is higher or lower than a threshold value.

9. The heater-equipped seat according to claim 8, wherein the threshold value changes according to a temperature of an environment where the seat is used.

* * * * *